United States Patent
Paiva et al.

(10) Patent No.: US 6,695,377 B2
(45) Date of Patent: Feb. 24, 2004

(54) LIFTGATE WITH LOW-LIFTOVER LIFTGLASS

(75) Inventors: A. Michael Paiva, Novi, MI (US); Rakesh Sehgal, Troy, MI (US); Phillip Joseph Linson, Commerce Township, MI (US); Lynn David DaDeppo, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/354,478

(22) Filed: Jan. 30, 2003

(65) Prior Publication Data
US 2003/0173797 A1 Sep. 18, 2003

Related U.S. Application Data (63) Continuation of application No. 09/910,741, filed on Jul. 23, 2001.

(51) Int. Cl.[7] .............................................. B62D 25/00
(52) U.S. Cl. ...................................... 296/56; 246/146.8
(58) Field of Search ............................... 296/56, 146, 8, 296/50, 146.2

(56) References Cited

U.S. PATENT DOCUMENTS

| | | | |
|---|---|---|---|
| 4,436,336 A | 3/1984 | Shimizu | |
| 4,799,730 A | 1/1989 | Harasaki | |
| 5,449,213 A | 9/1995 | Kiley et al. | |
| 5,667,868 A | 9/1997 | Freeman | |
| 5,730,028 A | 3/1998 | Maue et al. | |
| 6,000,747 A | 12/1999 | Sehgal et al. | |
| 6,019,418 A | 2/2000 | Emerling et al. | |
| D421,949 S | 3/2000 | Shimazu | |
| D425,003 S | 5/2000 | Gabath | |
| 6,068,327 A | 5/2000 | Junginger | |
| 6,089,648 A | 7/2000 | Schurig et al. | |
| 6,126,222 A | 10/2000 | Nguyen et al. | |
| 6,168,742 B1 | 1/2001 | Yamamoto | |
| 6,187,233 B1 | 2/2001 | Smith | |
| 6,202,350 B1 | 3/2001 | Montgomery et al. | |
| 6,211,290 B1 | 4/2001 | Xiao et al. | |
| 6,220,649 B1 | 4/2001 | Rife | |
| D441,691 S | 5/2001 | Pfeiffer et al. | |
| 6,227,598 B1 | 5/2001 | Ichioka et al. | |
| D445,747 S | 7/2001 | Martin et al. | |
| D446,167 S | 8/2001 | Faurote et al. | |
| D447,093 S | 8/2001 | Faurote et al. | |

FOREIGN PATENT DOCUMENTS

EP    0 440 649    1/1982

Primary Examiner—Joseph D. Pape
(74) Attorney, Agent, or Firm—Gigette M. Bejin (57) ABSTRACT

A motor vehicle includes a rear body opening that is closed by an upwardly-pivoting liftgate assembly that itself defines, when in a closed position, a secondary opening whose lowermost portion achieves a height on the vehicle significantly below the vehicle's beltline. The liftgate assembly also includes a pivotally mounted liftglass assembly for closing the secondary opening, thereby permitting limited access through the secondary opening into an interior space of the vehicle. When the liftglass assembly is in its closed position, the lowermost edge of the liftglass assembly extends downwardly on the vehicle to a height significantly lower than the vehicle beltline. A raised feature of the liftglass assembly, preferably having a color and surface finish that is coordinated with a painted body surface, defines a step that is substantially aligned with the vehicle beltline to thereby aesthetically substantially continue the vehicle beltline across the rear of the vehicle.

8 Claims, 4 Drawing Sheets

LIFTGATE WITH LOW-LIFTOVER LIFTGLASS

CROSS-REFERENCE TO RELATED APPLICATION

This application is a continuation of U.S. application Ser. No. 09/910,741, filed Jul. 23, 2001, entitled "LIFTGATE WITH LOW-LIFTOVER LIFTGLASS", which is assigned to the assignee of the present invention.

FIELD OF THE INVENTION

The invention relates to closure panels used to close an opening defined in the rear portion of a vehicle body, as is often found in minivans, sport utility vehicles, and hatchbacks.

BACKGROUND OF THE INVENTION

Minivans, sport utility vehicles, hatchbacks, and other similar vehicles typically feature a rearward opening defined in the rear portion of the vehicle's body. The prior art generally teaches the use of one or more movable "closure panels" with which to close such openings while otherwise permitting access through the opening to an interior space defined within the vehicle body, such as the interior of the vehicle or a cargo space situated in the rear of the vehicle.

When a single closure panel is used, the single closure panel is typically pivotally mounted to the vehicle body at the panel's upper edge, such that the panel is pivoted upwards to reveal the rear body opening. Such single closure panels are often called "liftgate assemblies", and are often used in conjunction with a continuous weatherstrip secured around the periphery of the rear body opening to thereby obtain a superior weatherseal when the liftgate assembly is in its "closed" position. Because the entire liftgate assembly is pivoted upward as a single unit to reveal the rear body opening, such liftgate assemblies advantageously provide maximum access to the rear body opening while further featuring a relatively low "liftover" height, thereby facilitating the ingress and egress, for example, of large or heavy items into the vehicle through the rear body opening. However, such known liftgate assemblies generally require a substantial clearance behind and, perhaps, above the rear of the vehicle in order to be fully deployed to the "open" position, thereby possibly limiting the circumstances under which such maximum access to the rear body opening may be obtained. Moreover, such known liftgate assemblies tend to have greater weight, making such assemblies more difficult to open and, hence, of reduced convenience to a person seeking to gain either quick or a relatively more limited degree of access to the rear body opening.

Such known liftgate assemblies usually include a window positioned in the upper portion of the closure panel to improve driver visibility. Typically, the lowermost edge of the window is generally aligned with the vehicle's "beltline", as defined by the lowermost edges of the windows on either side of the vehicle proximate to the liftgate assembly. The alignment of the liftgate assembly's window with the vehicle beltline is generally considered to provide an aesthetically desirable visual continuation of the beltline across the rear of the vehicle.

The window of such known liftgate assemblies is either fixed or is pivotally mounted at its upper edge to the upper portion of the liftgate assembly. Such a pivotally mounted window, also known in the art as a "flipglass" or a "liftglass", advantageously provides the liftgate assembly with a relatively quick but relatively more limited access to the rear body opening. It will be appreciated, however, that the access provided by the liftglass is characterized by an increased "liftover" height, relative to the lower periphery of the rear body opening, due to the alignment of the lowermost edge of the liftglass with the vehicle beltline.

The prior art alternatively teaches use of plural closure panels. For example, the combination of either a lower, downwardly pivoting, full-width closure panel (often called a "tailgate assembly") or a pair of lower, laterally pivoting half-width closure panels (often called "Dutch doors"), and a relatively smaller, upwardly pivoting, full-width closure panel that, in its most simple configuration, is a liftglass. Because each of the plural closure panels is substantially smaller than the single closure panel of an analogous liftgate assembly, each closure panel is likely to be lighter, and less clearance is likely to be required in order to fully deploy a given panel to its open position. However, the lower edge of the liftglass in these oppositely pivoting multiple-panel embodiments nonetheless remains generally aligned with the vehicle beltline for aesthetic reasons, again providing a relatively increased liftover height when the liftglass alone is pivoted upwards to permit access to the rear body opening.

The so-called "liftover height" of known liftgate assemblies is higher than the height of a wheeled shopping cart commonly used to transport groceries and other items from a retail establishment to a parked sport utility vehicle or minivan. This typically is due to the vehicle body designer's objective to maintain general alignment of the lowermost margin of the liftgate window with the vehicle beltline. Such alignment is perceived by vehicle purchasers to have aesthetic advantages. Because of the greater "liftover height", loading of the cargo area of the vehicle from a shopping cart is unduly burdensome.

SUMMARY OF THE INVENTION

It is, therefore, an object of the invention to provide a liftglass assembly, and a method of making such a liftglass assembly, for closing a rear body opening of a motor vehicle, wherein the liftglass assembly includes a lowermost edge that extends below a vehicle "beltline" as defined by a side feature of the vehicle, and wherein the liftglass assembly includes a raised feature that is offset from the lowermost edge and, preferably, substantially aligned with the vehicle beltline to thereby aesthetically substantially continue the vehicle beltline across the rear of the vehicle.

It is also an object of the invention to provide a liftglass assembly, and a method of making such a liftglass assembly, for a motor vehicle whose body is painted with a selected body color, wherein the liftglass includes a raised surface having a color that is coordinated with the selected body color.

It is a further object of the invention to provide a liftglass assembly, and a method of making such a liftglass assembly, for a motor vehicle whose body includes a selected surface finish, wherein the liftglass includes a raised surface having a surface finish that is substantially the same as the selected surface finish.

Another object of the invention is to provide a liftgate assembly for closing a rear body opening of a motor vehicle, wherein the liftgate assembly features a liftglass that provides access into an adjacent interior space of the vehicle characterized by a liftover height that is less than that of known liftgate/liftglass assemblies.

Yet another object of the invention is to provide a liftgate assembly for closing a rear body opening of a motor vehicle that features a liftglass whose lowermost edge extends below the vehicle beltline as defined by a side body feature, but which nominally preserves the desirable aesthetic feature of substantially continuing the vehicle beltline across the rear of the vehicle.

Under the invention, a liftglass assembly is provided for closing an opening defined in a body of a motor vehicle, wherein the vehicle includes features defining a vehicle beltline that intersects the opening. The liftglass assembly includes a glass panel adapted to be pivotally mounted on the liftgate assembly such that the glass panel is movable between a closed position overlying the opening and an open position allowing access to the opening. The liftglass assembly further includes an appliqué permanently secured to a lower portion of the glass panel, the appliqué defining at least a portion of a surface feature that substantially traverses the lower portion of the glass panel in substantial alignment with the vehicle beltline when the glass panel is in the closed position. In a preferred embodiment, wherein the glass panel includes a lowermost edge when in the closed position, the surface feature is a surface contour discontinuity or "step" that is defined, in part, by an edge of the appliqué that is vertically offset from the glass panel's lowermost edge.

In accordance with one feature of the invention, the lower margin of the liftgate glass is located at a predetermined height from a road surface. That predetermined height is approximately equal to or lower than the height of a shopping cart of the kind commonly used at retail establishments, which typically is about 43 inches. This feature makes it much less burdensome to load groceries and other cargo from a shopping cart into the cargo area of the vehicle. The lower edge of the liftgate assembly rear body opening, notwithstanding the increased size of the liftgate glass opening, is effective to keep bottles, cans and other items from rolling out onto a parking lot during the process of loading and unloading the vehicle cargo area. Further, the lower portion of the liftgate assembly below the lower margin of the liftgate glass readily permits packaging the vehicle license plate.

By way of example only, in the preferred embodiment, the appliqué is formed of a TPO material whose exterior surface is provided with a "Class 1" finish to generally match that of the vehicle's painted body and, most preferably, has a color that is coordinated with a selected body color of the vehicle. In the preferred embodiment, the appliqué is permanently secured, for example, by a suitable urethane adhesive to an intermediate substrate material that is itself permanently secured to the lowermost portion of the glass panel. The use of the intermediate substrate material and, particularly, the forming of such an intermediate substrate material about or against the lowermost portion of the glass panel, for example, as by injection molding, advantageously provide a substrate surface for supporting the appliqué that is characterized by a desired contour, notwithstanding the presence of any "off-form" tolerance waves in the surface contour of the lower portion of the glass panel.

In accordance with the invention, a method for making a liftglass assembly for a motor vehicle includes defining a surface feature on a lower portion of a glass panel, for example, by inserting at least the lower portion of the glass panel into a mold and over-molding a suitable substrate material about the lower portion of the glass panel to obtain a raised substrate surface; and permanently securing an appliqué to the raised substrate surface. In a preferred method of practicing the invention, in which the raised substrate surface is formed of an injection-molded urethane and the appliqué is formed of a TPO material, the step of permanently securing the appliqué to the raised substrate surface includes surface treating the raised substrate surface and, if necessary, an inner face of the appliqué to facilitate adhesion; and permanently bonding the inner face of the appliqué to the raised substrate surface with a first adhesive.

In accordance with a further feature of the invention, in a preferred method, the step of permanently securing the appliqué to the raised substrate surface includes bonding a relatively small portion the inner face of the appliqué to the raised substrate surface with a second adhesive, the second adhesive being characterized by a substantially reduced set or cure time relative to the first adhesive. By way of example only, in the preferred method, the first adhesive is a urethane adhesive that is applied to a first portion of the raised substrate surface appliqué that includes its entire periphery, and the second adhesive is a hot melt adhesive that is applied to several small, spaced portions of the raised substrate surface. The hot melt adhesive advantageously serves to "fixture" the appliqué to the raised substrate surface during the period in which the first adhesive cures.

In accordance with another feature of the invention, a liftgate assembly is also provided for closing a rear body opening of a motor vehicle that has a vehicle beltline defined by one or more side body features, such as the lowermost portions of one or more side windows. The liftgate assembly includes a closure panel that is pivotally mounted on the vehicle body so as to move between a closed position, in which the closure panel entirely overlies the rear body opening, and an open position permitting access to the rear body opening. A secondary opening defined in the closure panel includes a lowermost portion that extends to a height on the vehicle below the vehicle beltline when the closure panel is in the closed position.

The liftgate assembly further includes a liftglass assembly whose upper portion is pivotally mounted on the closure panel proximate to an upper edge of the liftglass assembly, and whose lower portion includes a raised surface feature, which defines a visual element of the liftglass assembly that is vertically offset from the lowermost edge of the liftglass assembly and, most preferably, is substantially aligned with the vehicle beltline when the liftglass assembly closes the secondary opening to thereby aesthetically substantially continue the vehicle beltline across the rear of the vehicle. In a preferred embodiment, the raised surface feature of the liftglass assembly is defined, at least in part, by an appliqué that is permanently secured to the lower portion of the glass panel and, most preferably, that has a color and surface finish that is coordinated with a selected painted body surface of the vehicle.

The above object and other objects, features, and advantages of the invention are readily apparent from the following detailed description when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Detailed Description of Preferred Embodiment, with reference to the drawings, wherein.

DETAILED DESCRIPTION OF AN EMBODIMENT OF THE INVENTION

Figure 1:
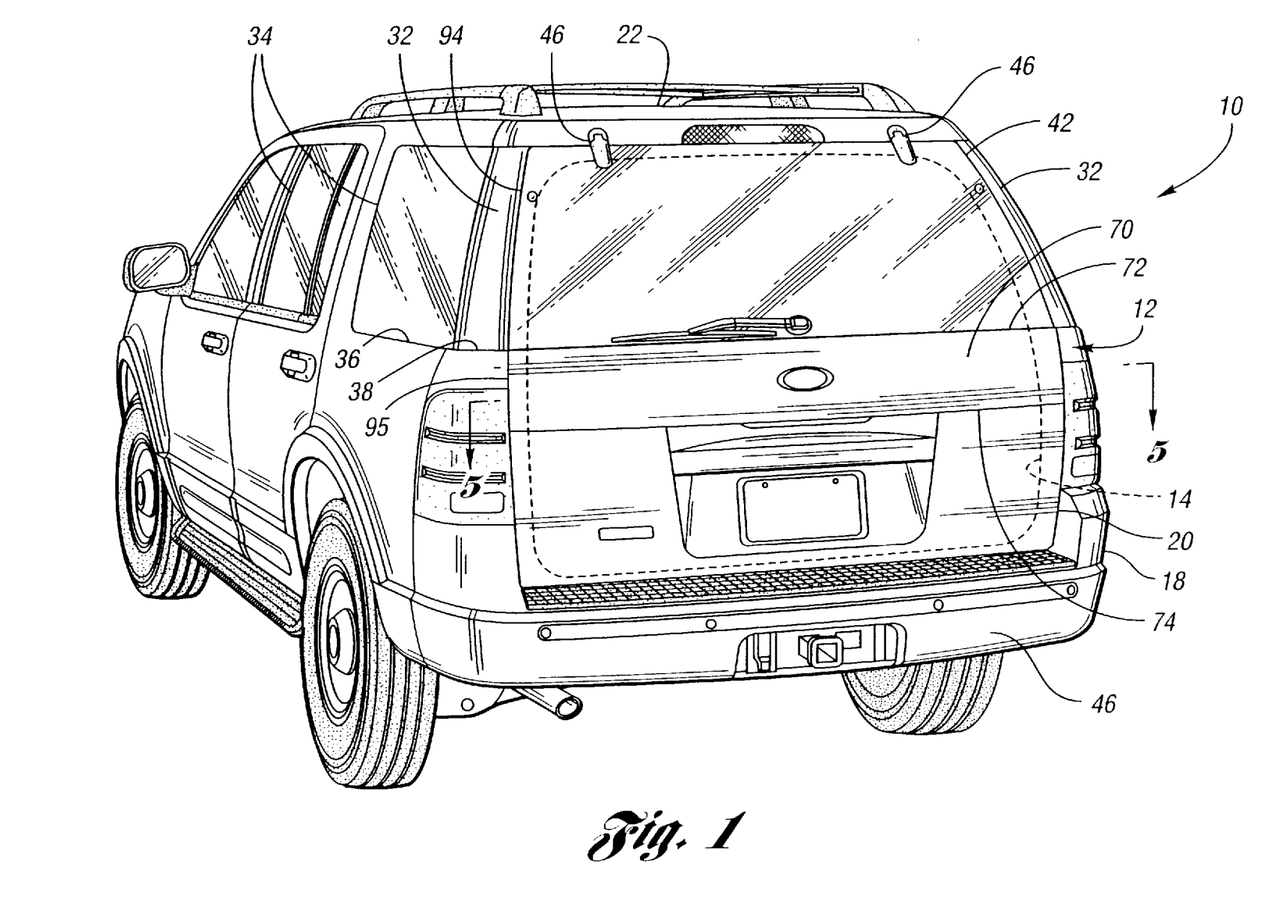
FIG. 1 is a rear-quarter view in perspective of a motor vehicle with an exemplary liftgate assembly featuring a low-liftover height liftglass assembly in accordance with the invention.
Figure 2:
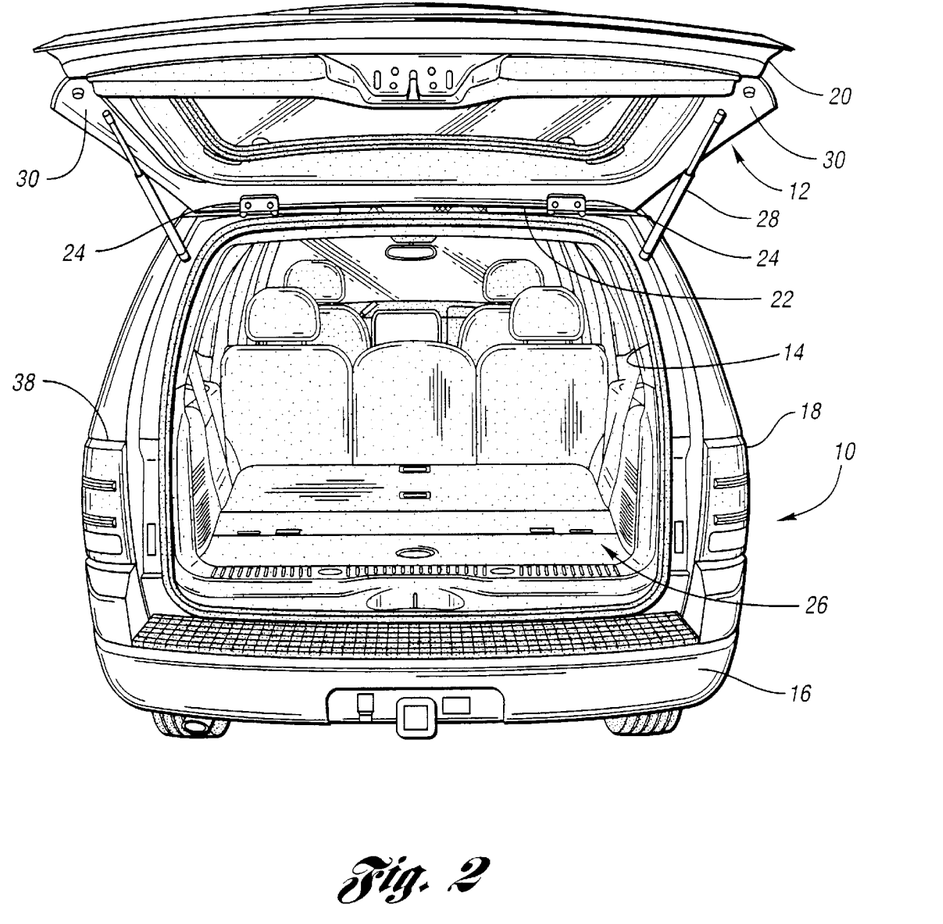
FIG. 2 is a rear elevational view of the vehicle shown in FIG. 1, showing the exemplary liftgate assembly in the open position.

Referring to the drawings, FIG. 1 is a partial rear quarter view in perspective of a motor vehicle, such as a sport utility vehicle 10, featuring an exemplary liftgate assembly 12 in accordance with the invention for closing a generally rectangular opening 14 defined in the rear 16 of the vehicle's body 18. The exemplary liftgate assembly 12 includes a main closure panel 20 that entirely overlies the rear body opening 14. As seen in FIG. 2, the main closure panel 20 is pivotally mounted to the vehicle body 18 proximate to the panel's upper edge 22, for example, by a first pair of laterally spaced hinges 24. In this manner, the liftgate assembly 12 can be pivoted upward about the axis defined by the hinges 24 to provide full access through the rear body opening 14 to the vehicle's load floor 26. A first pair of pneumatic, "over-center" struts 28 urge the main closure panel 20 toward, and thereafter support the main closure panel 20 in, the open position after the main closure panel 20 is first raised to a threshold, intermediate height.

Returning to FIG. 1, when the main closure panel 20 is in the closed position, the first pair of struts 28 is covered by respective lateral portions 30 of the main closure panel 20 which, in the disclosed vehicle 10, further serve to define the cosmetic, exterior surfaces 32 of the vehicle's "D pillar". However, it will be appreciated that the invention contemplates configurations in which the lateral portions 30 of the main closure panel 20 provide the liftgate assembly 12 with a substantially continuous, rearview "cut line". Also as seen in FIGS. 1 and 2, the vehicle 10 includes a plurality of windows 34 disposed on either side of the vehicle's body 18. The lowermost edges 36 of each side window 34 cooperate with other side body features to define a "beltline" on the vehicle 10.

Figure 3:
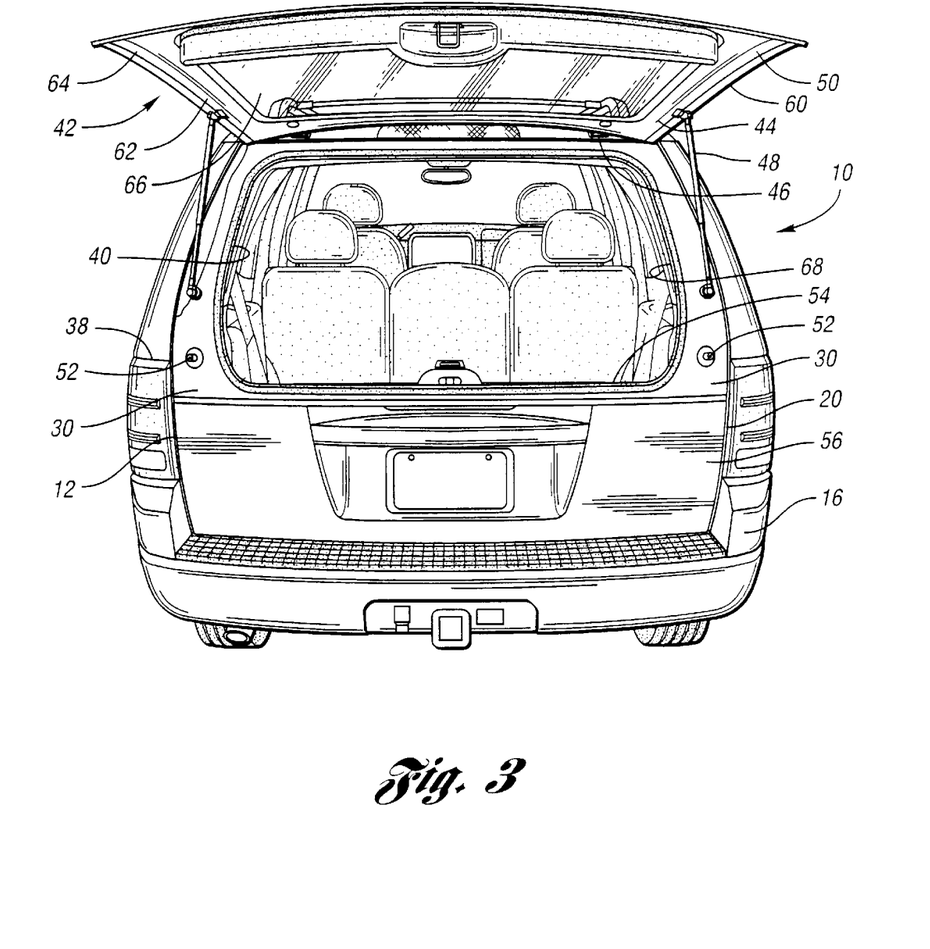
FIG. 3 is a rear elevational view of the vehicle similar to FIG. 2, but showing the liftglass assembly alone in the open position.
Figure 4:
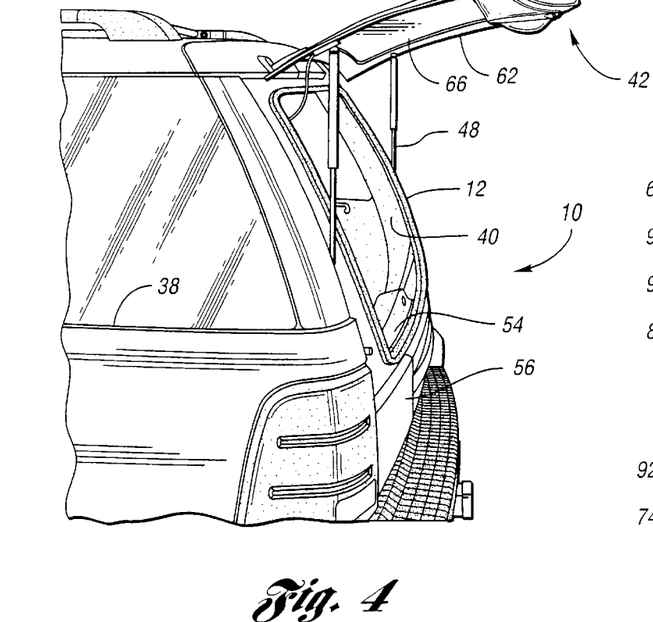
FIG. 4 is a partial side elevational view of the vehicle taken in the direction of arrow 4 of FIG. 3.

As best seen in FIGS. 3 and 4, the main closure panel 20 of the liftgate assembly defines a further, secondary opening 40 in the rear 16 of the vehicle 10, through which relatively more limited access to the vehicle's load floor 26 is obtained. The liftgate assembly 12 further includes a liftglass assembly 42 for closing the secondary opening 40. The liftglass assembly 42 includes an upper portion 44 that is pivotally mounted on the main closure panel 20, again, as by a second pair of laterally spaced hinges 46. A second pair of pneumatic, "over-center" struts 48 urge the liftglass assembly 42 toward, and thereafter support the liftglass assembly 42 in, the open position after the liftglass assembly 42 is similarly first raised to a predetermined intermediate height. When closed, the lower portion 50 of the liftglass assembly 42 bears against a pair of rubber bumpers 52 mounted on the lateral portions 30 of the main closure panel 20 (the rubber bumpers 52 being illustrated in FIG. 3).

As seen in FIGS. 3 and 4, in accordance with a feature of the invention, the lowermost portion 54 of the liftgate assembly's secondary opening 40 achieves a relative height on the vehicle 10 that is significantly lower than the vehicle's beltline 38. Stated another way, the vehicle beltline 38 may be said to intersect the secondary opening 40 of the liftglass assembly 42 when the liftglass assembly 42 is in the closed position. In this manner, a low "liftover" height is advantageously achieved when the liftglass assembly 42 is raised, thereby providing improved access to the vehicle interior through the secondary opening 40, while the lower portion 56 of the closed liftgate assembly's main closure panel 20 operates to prevent items already placed on the load floor 26 of the vehicle cargo space from falling rearward out of the vehicle 10 when the liftglass assembly 42 is opened. It will also be appreciated that, by significantly lowering the secondary opening's lowermost portion 54 in accordance with the invention, the secondary opening 40 is thereby also provided with a substantially increased vertical dimension relative to known, beltline-limited liftglass assemblies, while further beneficially reducing the overall weight of the resulting liftgate assembly 12.

In accordance with the invention, the liftglass assembly 42 includes a thin, contoured glass substrate or "glass panel 60" that roughly defines, in plan view, the overall shape of the liftglass assembly 42. The periphery 62 of the glass panel 60 is opaque, for example, as by coating peripheral portions of the glass panel's interior surface 64 with a suitable ceramic paint, to thereby visually define an integrally "framed" window 66 within the liftglass assembly 42. When the liftglass assembly 42 is in the closed position as illustrated in FIG. 2, the opaque periphery 62 of the glass panel 60 overlies the lateral portions 30 of the main closure panel that serve to define the secondary opening 40 while further obscuring from exterior view, for example, the weatherstripping 68 that is disposed on the main closure panel 20 about the secondary opening 40.

Figure 5:
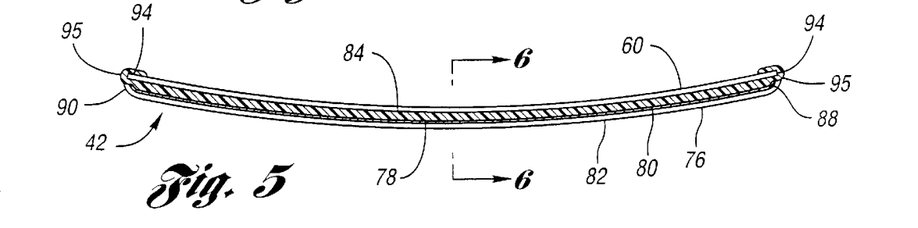
FIG. 5 is a partial sectional view of the liftgate assembly taken along line 5—5 of FIG. 1.
Figure 6:
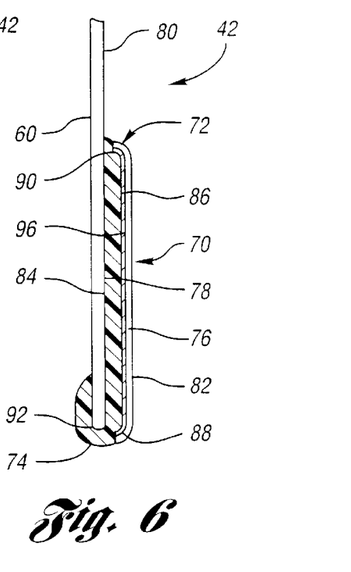
FIG. 6 is a partial sectional view of the liftgate assembly taken along line 6—6 of FIG. 5.
Figure 7:
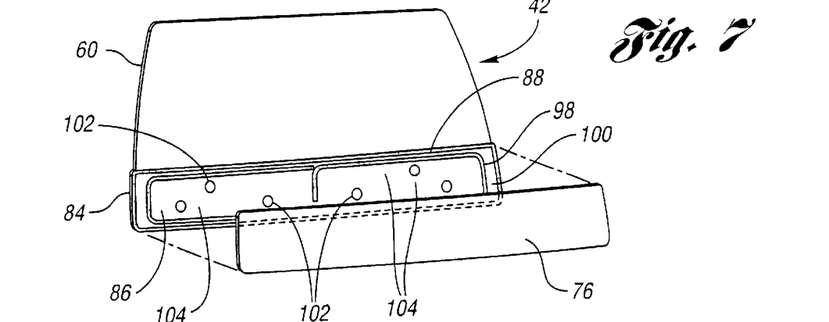
FIG. 7 is a partially-exploded view in perspective of the liftglass assembly, immediately before the liftglass assembly's appliqué is permanently bonded to a raised intermediate substrate surface molded on the lower portion of the liftglass assembly's glass panel.

Referring again to FIG. 1, the lower portion 50 of the liftglass assembly 42 includes a raised surface feature 70 defining a step 72 that is vertically offset from the lowermost edge 74 of the liftglass assembly 42 and is substantially aligned with the vehicle beltline 38. While the invention contemplates defining the step 72 on the liftglass assembly 42 in any suitable manner, in the exemplary liftgate assembly 42, as best seen in FIGS. 5–7, the raised feature 70 is defined in part by an appliqué 76 that is permanently secured to the lower portion 78 of the glass panel's exterior surface 80, with the desired step 72 being defined by an upper edge of the appliqué 76. Under the invention, the use of a separate appliqué 76 with which to define the raised feature 70 of the liftglass assembly 42 ensures that the raised feature 70 can be provided any desired color and/or surface finish.

In order to ensure that the outer face 82 of the appliqué 76 maintains a desired surface contour when permanently secured to the lower portion 78 of the glass panel 60, notwithstanding the presence of "off-form" tolerance waves in the lower portion 78 of the glass panel 60, an intermediate substrate material 84 is preferably used to define a raised substrate surface 86 on the lower portion 78 of the glass panel 60 that has the desired exterior surface contour, to which the appliqué 76 may then be permanently bonded. In a preferred method, the raised substrate surface 86 is obtained using a low-pressure reaction injection molding (RIM) process, in which a suitable urethane material is over-molded about the lower portion 78 of the glass panel 60.

Preferably, as seen in FIGS. 5–7, the raised substrate surface 86 is itself provided with a stepped peripheral edge 88, within which to receive the slightly turned periphery 90 of the appliqué 76 to improve both the appearance and durability of the resulting liftglass assembly 42. Further, the intermediate substrate material 84 is preferably over-molded about the lowermost edge 92 and respective lateral edges 94 of the glass panel 60, thereby advantageously providing the resulting liftglass assembly 42 with a molded urethane edge along its lower portion 50. As best seen in FIG. 1, the resulting over-molded lateral edges 95 of the intermediate substrate material 84 are slightly laterally offset from the respective lateral edges 94 of the glass panel, as seen in FIG. 2, thereby defining a pair of rearview cut-lines on the lower portion 50 of the liftglass assembly 42 that are laterally offset from the pair of rearview cut lines defined by the glass panel's lateral edges 94 on the upper portion 44 of the liftglass assembly 42. However, it will be appreciated that the invention contemplates, for example, modification of the lateral edges 94 of the glass panel 60 as necessary, such that the liftglass assembly 42 defines a pair of substantially continuous rearview cut lines on the rear of the vehicle 10 when the liftglass assembly 42 is closed over the secondary opening 40.

The raised substrate surface 86 is surface treated, where necessary or desired, after molding to ensure or enhance appliqué adhesion. By way of example only, where the intermediate substrate material 84 is a molded urethane, the resulting raised substrate surface 86 is preferably cleaned using a suitable cleaner, such as ethyl alcohol applied with a piece of "Scotchbrite" brand cleaning pad sold by the Minnesota Mining and Manufacturing Company; and then primed with a suitable primer, such as an "Essex" brand primer sold by DuPont.

While the invention contemplates use of an appliqué 76 formed of any suitable material, in the exemplary liftgate assembly 12, the appliqué 76 is formed of an engineering thermoplastic material, such as an injection-molded "thermoplastic olefin" polymer (TPO). In accordance with a feature of the invention, the outer face 82 of the appliqué 76 is provided with a surface finish that generally matches that of the vehicle's painted body 18 and has a color that is "coordinated with", i.e., is either the same as or is aesthetically compatible with, a selected body color of the vehicle 10. The color may be integrated into the material of the appliqué 76, as through the use of pigments in the material blend; or through any suitable process by which to provide the outer face 82 of the appliqué 76 with the desired color, including the use of co-molded paint film laminates. It will be appreciated that, to the extent necessary to ensure or enhance the adhesion of a conventional color or clear paint coat to the outer face 82 of the appliqué 76, the outer face 82 of the appliqué 76 may also be surface treated in any suitable manner.

While the invention contemplates any suitable manner for permanently securing the appliqué 76 to the lower portion 78 of the glass panel 60 or preferably, as indicated above, to the contoured, raised substrate surface 86 defined on the lower portion 78 of the glass panel 60, in the exemplary liftgate assembly 12, the inner face 96 of the appliqué 76 is permanently bonded to the raised substrate surface 86 using a suitable urethane adhesive, such as an "Essex" brand urethane adhesive sold by DuPont.

As illustrated in the partial, exploded view of FIG. 7, in the preferred method, a bead 98 of the urethane adhesive is applied to a first portion 100 of the raised substrate surface 86, whereupon the inner face 96 of the appliqué 76 is pressed against the raised substrate surface 86. To facilitate such permanent bonding, the inner face 96 of the TPO appliqué 76 is preferably surface treated in any suitable manner to ensure or enhance adhesion. By way of example only, in the exemplary liftgate assembly 12, a thin layer of an adhesion promoter or "primer" is applied as by using a wick applicator to the inner face 96 of the appliqué 76 before bonding with the urethane adhesive. It will be appreciated that the invention contemplates use of any other suitable surface treatment on the inner face 96 of the appliqué 76 including, without limitation, plasma treatment, corona discharge, or surface etching.

In accordance with a further feature of the invention, because the urethane adhesive may require a substantial amount of time within which to cure, the step of permanently securing the appliqué 76 to the raised substrate surface 86 further includes bonding a relatively small portion the inner face 96 of the appliqué 76 to the raised substrate surface 86 with a second adhesive, the second adhesive being characterized by a substantially reduced set or cure time relative to the first adhesive. Thus, in the preferred method illustrated by the exploded view of FIG. 7, where the bead 98 of urethane adhesive is applied to the first portion 100 of the raised substrate surface 82 that includes its entire periphery, the second adhesive is a hot melt adhesive 102 that is applied in dollops to several small, spaced portions 104 of the raised substrate surface 86 immediately before the appliqué 76 is pressed against the raised substrate surface 86. The hot melt adhesive 102 advantageously serves to "fixture" the appliqué 76 to the raised substrate surface 86 during the period in which the urethane adhesive 98 cures.

While an exemplary embodiment of the invention has been illustrated and described, it is not intended that the disclosed embodiment illustrate and describe all possible forms of the invention. Rather, the words used in the specification are words of description rather than limitation, and it is understood that various changes may be made without departing from the spirit and scope of the invention.

What is claimed:

1. A liftglass assembly for closing an opening in a body of a motor vehicle for use on a road surface, wherein the vehicle body includes features defining a vehicle beltline that intersects the opening, the vehicle body having a cargo area for transporting cargo, the cargo area being adapted to be loaded with cargo from a portable cart of predetermined height, the liftglass assembly comprising:

a glass panel adapted to be pivotally mounted proximate to the opening whereby the glass panel is movable between a closed position overlying the opening and an open position allowing access to the cargo area through the opening, the glass panel having an upper portion defining a window, and a lower portion positioned beneath the window when the glass panel is in the closed position;

the lower portion of the glass panel having a lower margin with a height from the road surface not substantially greater than the predetermined height of the portable cart.

2. A liftglass assembly for closing an opening in a body of a motor vehicle for use on a road surface, wherein the vehicle body includes features defining a vehicle beltline that intersects the opening, the vehicle body having a cargo area for transporting cargo, the cargo area being adapted to be loaded with cargo from a portable cart of predetermined height, the liftglass assembly comprising:

a glass panel adapted to be pivotally mounted proximate to the opening whereby the glass panel is movable between a closed position overlying the opening and an open position allowing access to the cargo area through the opening, the glass panel having an upper portion defining a window, and a lower portion positioned beneath the window when the glass panel is in the closed position;

the lower portion of the glass panel having a lower margin with a height from the road surface not substantially greater than the predetermined height of the portable cart, whereby the cargo area can be loaded and unloaded manually with reduced effort;

the lower portion of the glass panel having a surface feature secured thereto, the surface feature substantially traversing the lower portion of the glass panel in substantial alignment with the vehicle beltline when the glass panel is in the closed position.

3. The liftglass assembly of claim 2 wherein the glass panel includes a lowermost edge, and wherein the surface feature is raised to define a step in generally parallel spaced relationship with respect to at least a portion of the lowermost edge of the glass panel.

4. A liftgate assembly for closing a rear opening in a body of a vehicle for use on a road surface, wherein the vehicle body includes a plurality of side features defining a vehicle beltline, the vehicle body having a cargo area for transporting cargo, the cargo area being adapted to be loaded with cargo from a portable cart of predetermined height, the liftgate assembly comprising:

a first closure panel adapted to be pivotally mounted on the vehicle body proximate to the rear body opening whereby the first closure panel is movable between a closed position overlying the rear body opening and an open position allowing access to the cargo area through the rear body opening, the first closure panel defining a secondary opening in the motor vehicle body when the first closure panel is in the closed position; and a second closure panel pivotally mounted on the first closure panel proximate to the secondary opening whereby the second closure panel is movable between a closed position overlying the secondary opening and an open position allowing access to the cargo area through the secondary opening when the first closure panel is in the closed position, the secondary opening including a lower edge with a height from the road surface not substantially greater than the predetermined height of the portable cart, whereby the cargo area can be loaded and unloaded manually with reduced effort.

5. The liftgate assembly of claim 4 wherein the second closure panel has an upper portion defining a window and a lower portion, including a raised surface feature, in substantial alignment with the vehicle beltline when the first and second closure panels are in their respective closed positions.

6. The liftgate assembly of claim 5, wherein the raised surface feature is an injection molded polymer.

7. In a passenger vehicle, a rear liftgate assembly that facilitates the loading of an item from a conventional shopping cart into the vehicle, the vehicle having a body with side features defining a beltline, the vehicle body having a rear opening with an upper margin and a lower margin, the liftgate assembly comprising:

a first liftgate section defined by a main closure panel pivotally connected to the upper margin of the rear opening of the vehicle body;

a second liftgate section defined by a liftglass assembly pivotally mounted whereby the first liftgate section and the second liftgate section cooperate to close the rear opening when the first and second liftgate sections are in their respective closed positions; and the second liftgate section having a window and a panel, the panel being mounted below the window, the window and the panel acting together to provide a load opening that extends below the beltline of the vehicle body when the first liftgate section is in its closed position to facilitate the loading of items from the shopping cart.

8. The invention according to claim 1, wherein the second liftgate section is pivotally mounted on the first liftgate section, and both of the first and second liftgate sections define the liftgate assembly, the second liftgate section having a lower margin between the window and the lower margin of the rear opening.

* * * * *

UNITED STATES PATENT AND TRADEMARK OFFICE
CERTIFICATE OF CORRECTION

PATENT NO. : 6,695,377 B2 Page 1 of 1
APPLICATION NO. : 10/354478
DATED : February 24, 2004
INVENTOR(S) : A. Michael Paiva et al.

It is certified that error appears in the above-identified patent and that said Letters Patent is hereby corrected as shown below:

Column 10, line 35, delete "claim 1" and substitute --claim 7--.

Signed and Sealed this

Nineteenth Day of February, 2008

JON W. DUDAS
*Director of the United States Patent and Trademark Office*